United States Patent [19]

Rawlings et al.

[11] 4,216,234
[45] Aug. 5, 1980

[54] LIPID ENCAPSULATED FEED SUPPLEMENT AND PROCESS FOR PRODUCING SAME

[75] Inventors: Robert M. Rawlings; Donald Procter, both of Boise, Id.

[73] Assignee: Blue Wing Corporation, Boise, Id.

[21] Appl. No.: 944,346

[22] Filed: Sep. 21, 1978

Related U.S. Application Data

[63] Continuation of Ser. No. 665,004, Mar. 8, 1976, abandoned, which is a continuation-in-part of Ser. No. 649,808, Jan. 16, 1976, abandoned.

[51] Int. Cl.$^2$ .......................... A23K 1/04; A23K 1/08
[52] U.S. Cl. ........................................ 426/2; 426/98; 426/602; 426/583; 426/647; 426/807
[58] Field of Search ..................... 426/2, 98, 602, 601, 426/647, 583, 807

[56] References Cited

U.S. PATENT DOCUMENTS 4,073,960  2/1978  Scott et al. .......................... 426/807

FOREIGN PATENT DOCUMENTS 106543  6/1974  German Democratic Rep. ....... 426/98

*Primary Examiner*—R. B. Penland
*Attorney, Agent, or Firm*—Richards, Harris & Medlock

[57] ABSTRACT

A particulate composition which can be used as a fertilizer or feed or food additive for animals or humans is provided which comprises microencapsulated lipids in albumin. A process is also provided for making such composition which includes forming a dispersion or emulsion of globules of nutrient lipid within an aqueous albumin containing medium and thereafter forming a gel. The resulting gel can then be dried to form the particulate nutrient composition. This process is especially applicable in the use of animal blood as the source of albumin and provides for significant reduction of odors commonly associated with the drying of blood and thus represents a pollution control measure. The process can make a particulate nutrient feed additive or supplement which when fed to ruminant animals will preclude the bio-degradation of the majority of the nutrients in the rumen compartment of the stomach and thus provide for the manipulation of the site and form of assimilation of the nutrients by the ruminant is also provided.

12 Claims, No Drawings

LIPID ENCAPSULATED FEED SUPPLEMENT AND PROCESS FOR PRODUCING SAME

This is a continuation of copending application Ser. No. 665,004, filed Mar. 8, 1976 which is a continuation-in-part of application Ser. No. 649,808 filed Jan. 16, 1976, both now abandoned.

BACKGROUND OF THE INVENTION

This invention relates to an improved lipid encapsulated feed supplement and the process for producing same. Furthermore, this invention relates to fertilizer compositions. In one aspect, this invention relates to a novel feed supplement for ruminant animals comprising nutrient lipid microencapsulated in albumin containing proteinaceous material which, when ingested by a ruminant, protects the nutrients from degradation in the rumen of the animal but allows the nutrients to be assimilated within the abomasum and lower gut to thereby allow for a manipulation of the site and form of the nutrients and also render possible the effective feeding of increased amounts of lipid to the ruminant without effecting a gastric upset.

In a specific aspect, this invention relates to the utilization of animal blood as the source of albumin and nutrient lipid compositions to form food supplements for animals. In another aspect, the invention relates to eliminating the odors associated with the conventional drying of animal blood. In another aspect, the invention relates to eliminating the necessity for the conventional rendering of fat in order to make the fat suitable for use as a feed ingredient common to the feed industry.

Animal blood obtained in a typical slaughter house operation is either dried to form blood meal or is expelled as effluent. More specifically, liquid blood obtained as a by-product in slaughter house operations is a low value material and is often dumped by some smaller meat packers because they have no use or no sale for the material. Larger meat packing facilities have dryers and dry the blood to form a meal which is sold mainly as a fertilizer or animal feedstuff. In general, the blood meal is processed into a dry form on or near the slaughter house premises. Typically, blood is collected in holding vessels and periodically, when a sufficient quantity is collected, it is subjected to one of several possible heating processes which in effect dries the volatile constituents therefrom and thus the blood solids are recovered. This is conventionally accomplished in a batch type blood cooker, a ring dryer or a spray drying operation. These various drying processes utilize relatively large quantities of energy and produces obnoxious odors which are released into the atmosphere and surrounding environment. In addition, refrigeration of the blood may be required in the case of some spray drying operations. Substantial quantities of the nutrients in the blood can be lost through bio-degradation which may occur during typical storage and transit conditions. Substantial degradation of the nutrient value of blood solids is typical when the blood is exposed to the high temperatures associated with blood cooker operations. A more efficient process for utilization of blood, fat and collagen obtained from slaughter house operations is needed, i.e., a method of processing blood, fat and collagen into a usable and thus saleable commodity is needed which can be carried out without an undue expenditure of energy and without polluting the environment with obnoxious odors or effluents.

Furthermore, it is desirable to develop nutrient feedstuffs for animals which contain effective nutritional amounts of nutrient lipids. Earlier researchers have found that it is extremely difficult to feed large quantities of lipid to ruminant animals, i.e., quantities of lipids greater than 4 to 6%. Specifically, the ruminant animal has a multigastric system with a first stomach known as a rumen wherein bacteria generally known as microflora are present. These microflora have the ability to breakdown protein and lipids, among other things, and hydrogenate unsaturated lipids. Therefore, a significant portion of the unsaturated lipids contained in typical ruminant feeds are hydrogenated in the rumen by the microflora and are subsequently assimilated by the animal as saturated fat. Additionally, the rumen has a low tolerance to feeds containing high concentrations (4 to 6%) of either saturated or unsaturated lipids. This low tolerance produces severe gastric upset when feeds containing high concentration of unprotected lipids are ingested. For example, when large quantities of dietary lipids are fed to ruminants over and above 4 to 6% the ruminants consumption of total feed intake is typically reduced bringing about a dietary situation wherein there is not enough caloric intake to provide for effective net energy production and in some cases no energy maintenance of the animal. In addition, digestive disturbances occur because of the lipid floating on the liquid in the rumen, and the ruminant will drastically reduce its consumption until it has digested the lipid in the rumen. Furthermore, when such lipids are unsaturated, the rumen microflora will hydrogenate most of the same and little of the unsaturated lipid will become incorporated into the ruminant's meat or milk.

Recently, a process has been developed which encapsulates nutrient lipids in a protective protein-aldehyde complex coating. This process is disclosed in U.S. Pat. No. 3,925,560 issued Dec. 9, 1975. The protein-aldehyde coating covering the lipid is not susceptible to breakdown in the rumen but is susceptible to breakdown in the abomasum and lower gut. This process includes finely dividing a lipid material into discrete particles or globules and forming an aqueous emulsion of the finely divided lipid and a proteinaceous material. The aqueous emulsion can then be reacted with an aldehyde such that the finely divided lipid particles are encapsulated in a proteinaldehyde complex. The emulsion is treated with aldehyde and dried to form a coated particulate solid. Thus, this encapsulation process requires an aldehyde reactant to react with the proteinaceous material to form the rumen resistant coating over the lipid material.

An effective method of accomplishing the microencapsulating of dietary lipid materials in a dietary proteinaceous material without resorting to the use of exogenous chemicals is desirable.

SUMMARY OF THE INVENTION

According to the invention, a novel albumin containing nutrient food supplement for animals or humans and plants is provided which comprises a lipid encapsulated in albumin and other proteinaceous material. Furthermore according to the invention, a novel nutrient food supplement for animals or humans is provided which comprises a nutrient lipid assimilable by the animal or humans to which it is fed and microencapsulated in albumin and other proteinaceous material.

In accordance with one embodiment of the subject invention, the above novel compositions are produced by initially adjusting the pH of an aqueous medium containing at least 6 weight percent albumin to a pH in the range of from about 9.6 to about 12.5, forming a dispersion or emulsion of globules of the lipid in the aqueous medium, and thereafter heating the dispersion or emulsion at a temperature effective to form a lipid encapsulated gel. The resulting gel can then be dried to form a particulate food supplement comprising the lipid globules microencapsulated in the albumin and other proteinaceous material.

In accordance with a preferred embodiment of the subject invention, the novel nutrient of the subject invention is produced by initially adjusting the pH of an aqueous solution of animal blood to a pH within the range of about 9.6 to about 12.5, and thereafter forming a uniform dispersion or emulsion of lipid therewithin. Next, the dispersion of lipid in the blood is subjected to heat which as an example can be frictional heat within a milling operation such that the temperature of the admixing material is raised to a temperature within the range of 40° to 100° C. until a gel forms. Thereafter, the gel is dried to a moisture content of below about 13% by weight thereof to form the particulate encapsulated composition of the subject invention.

In accordance with another aspect of the subject invention, we have found that if the novel supplement of the subject invention containing nutrient lipids which are assimilable by a ruminant are fed to ruminant animals in quantities in excess of that which ruminant animals normally receive, 4 to 6%, the ruminant will assimilate the lipid and no digestive disturbances occur.

DETAILED DESCRIPTION OF THE INVENTION

The subject invention makes possible a more efficient utilization of albumin containing products, such as animal blood and milk whey by combining it with a nutrient lipid such as animal fat for use as a nutrient food such as a feed supplement for ruminants or if manufactured under acceptable standards of hygiene could be used for human foods or food additives. Food supplements for other animals can also be produced by this novel process. These products can be manufactured at the meat packing plants where the ingredients are available, for example. Thus, such supplements can be made utilizing some of the existing equipment and facilities found at some of the larger meat packing plants and little additional processing equipment is required. The subject invention eliminates the necessity for rendering equipment typically required to stabilize fat into a form wherein it can be used in typical feed commerce. The subject invention also eliminates machinery, vessels and measures which may be required to maintain appropriate iodine values and peroxide levels in animal fat.

The term "albumin" as used herein is understood to be a protein found in milk whey and occuring in blood, lymph, chyle, and many other animal and vegetable tissues and fluids which has substantially a neutral pH in its naturally occurring state. Albumin is soluble in water, coagulates on heating, and is readily hydrolyzed to a number of amino acids. One readily available source of albumin is animal blood, e.g., the whole animal blood. Such is collected in large quantities during killing operations in meat packing plants, slaughterhouses, and the like. The blood so collected can vary in blood solid contents dependent upon the amount of dilution it receives from the wash water used to clean the kill floor. A solids content of from about 12% to about 21% is normal for the aqueous blood mixture which is collected under these conditions. Such solids content is believed to comprise about 50-60% albumin and 40-50% other blood proteins. Thus, as used herein, blood contains from about 6 to about 10.5 weight percent albumin and from about 6 to about 10.5 weight percent other blood proteins.

The term "gel" is to be understood to mean a crosslinked three dimensional network of fibers of albumin and other proteinaceous materials which bind the water and the lipid within the network. In producing the improved lipid encapsulated compositions of the present invention any suitable source of albumin can be employed. However, for the sake of simplicity the process for producing the composition will be described using animal blood as the albumin source.

In accordance with the process of the subject invention an aqueous medium of animal blood is contacted with an effective amount of a base to adjust the pH of the aqueous medium to a pH in the range of from about 9.6 to about 12.5. Thereafter, a nutrient lipid is admixed with the aqueous medium of animal blood such as by homogenization or forming an emulsion under emulsion forming conditions. Thus, the lipid is dispersed within the aqueous medium in globules having a size of less than about 0.1 millimeter and most preferably of a size on the order of 0.5 to 10 microns. The nutrient lipid which can be used in the scope of this invention can comprise any nutrient lipid which is assimilable by the animal to which it is fed. In feeding ruminant animals, for example, the nutrient lipids which can be used include saturated and unsaturated vegetable or animal fats. Examples of suitable materials include vegetable oils endogenous in or derived, for example, from soybeans, peanuts, sunflowers, safflowers, cottonseeds, maize and rape, etc., or animal fats or oils derived from non-ruminants such as fish, fowls, or pigs, or from ruminant animals. The fats and oils do not necessarily have to be separated from the flesh of fish, fowls, pigs or ruminant animals or in the case of oilseeds, extracted. After proper comminution, the entirety of such materials may be utilized in some cases.

Any suitable base can be employed to adjust the pH of the aqueous medium containing the animal blood. For example, the base constituent can be an alkali metal hydroxide or an alkaline earth metal hydroxide. Especially desirable results have been obtained wherein alkali metal hydroxides, such as sodium hydroxide, have been employed. Care must be exercised in adjusting the pH of the aqueous solution to maintain the pH within the desired range of 9.6 to about 12.5. Also, it should be noted that often the pH tends to decline upon the aqueous solution standing so that one may be required to employ additional base to maintain the aqueous solution within the described pH range.

When processing solid fat such as rendered animal fat in accordance with the subject invention, the fat is initially melted by heating to a temperature above the melting point of the fat, for example. The aqueous blood containing medium is also heated to about the same temperature as the melted fat. Thereafter the two ingredients are blended together and then homogenized. In accordance with one specific embodiment of the subject invention, the lipid includes raw fat (unrendered fat) obtained from the dead carcasses of animals such as ruminant animals. Therefore, the unrendered fat or low value fat can be used directly in the process to thereby effect saving in the cost of rendering. Furthermore, the collagen which is contained within the low value fat will be incorporated into the feed supplement increasing the value of this material. Currently the collagen, known as crackling, is rendered out of the fat and ends up with the rendering residues along with the bones. These residues are conventionally ground to form bone meal. In this instance, the fat is initially comminuted and processed in accordance with the manner that rendered solid fat is processed. When utilizing liquid lipid, such as vegetable oil, the lipid and the aqueous blood containing medium can be blended at ambient temperatures to form a uniform dispersion or emulsion of the lipid globules within the aqueous medium. In general, sufficient lipid is utilized such that the resulting dispersion or emulsion has a lipid content in the range of from about 5 to about 20% by weight. The dried food supplement will have a lipid content in the range of up to about 75% by weight thereof. After the lipid and aqueous medium containing animal blood dispersion or emulsion is formed, the proteinaceous material is heated to form a gel. The heating of the dispersion or emulsion is believed to result in denaturation of the proteinaceous material. A preferred way of forming a gel of the lipid-in-blood dispersion is to heat the dispersion to a temperature in excess of 40° C. For example, the dispersion or emulsion can be processed through a mill, such as a stone mill, and frictional heat will be imparted to the dispersion such that the resulting temperature ranges from about 40° C. to about 100° C. After the gel is formed, it can be utilized in the gel form or it can be dried in any conventional dehydrater or dryer to a moisture content of less than about 13 weight percent thereof and generally to a moisture content in the range of from about 8 to about 13 weight percent thereof. The drying operation can occur in a conventional manner in a conventional drying apparatus.

In normal blood collection procedures in slaughter houses, the blood is collected in vessels, tanks or vats. During this collection process, the blood may stand in the container and thus undergo or become subject to bio-degradation. Accordingly, the blood which is used in the scope of the subject invention is preferably treated with an anticoagulant which will also have the effect of inhibiting bio-degradation of the blood during storage prior to processing. Preferably, sufficient base is added to raise the pH of the blood to a value within the range of about 9.0 to about 11.5. Generally, from about 0.5 to about 1% by weight of the blood of the base is added in accordance with this embodiment and will not only prevent coagulation of the blood but also retards bacteria degradation of the blood during storage. In addition, the base is beneficial and helpful in forming an emulsion with lipids in the novel process of the subject invention.

As previously stated, preferably the formation of the gel occurs by passing the dispersion or emulsion of nutrient lipid in the aqueous blood containing medium to a processing operation which imparts heat thereto sufficient to increase the temperature in the range of from about 40° C. to about 100° C. A conventional mill which can be used, which for example, consists of two carborundum stones, one being a stator, the other a rotor powered by a motor. The dispersion is passed through a gap set between the two stones while the rotor stone is operating at high speed. The gap setting between the stone determines the degree of grinding, mixing or homogenizing as well as the extent to which frictional heat is created during the milling operation.

Thus, the gap between the mill stones can be adjusted to provide the desired amount of frictional heat until a satisfactory gel is formed. In general, the gap between the stones should be adjusted to impart a temperature above about 40° C., preferably 55° C., before a satisfactory gel will form. The temperature can be increased by reducing the gap between the stones until boiling is observed (a temperature of about 100° C.). In general, the preferred operating temperature for the mill is a temperature in the range of from about 60° C. to about 75° C. It is noted that the initial admixing, homogenizing, emulsifying or dispersing of the lipid within the aqueous blood containing medium as well as the heat treatment thereof can all occur within the stone mill. As another example, the aqueous medium and lipid can be emulsified in a standard waring food blender. Thereafter, the emulsion can be heated to a temperature in the range of from about 60° to 75° C. on a standard hot plate until a gel forms. The gel can then be dried in a laboratory fluid bed dryer to a moisture content of about 8 to 13% by weight.

After the gel formation stage of the process, the gel is preferably dried to a moisture content of less than about 13% by weight and more preferably to a moisture content in the range of from about 8 to 13% by weight. Drying can be carried out in any conventional agricultural dryer such as an agricultural drum type dehydrater. In essence, the firm gel is passed to the dryer and dried to the extent necessary to obtain the desired moisture content. The resulting dry particulate material from the drying process is granular in texture. If a very fine powder is desired, the gellation step occurs at the lowest temperature to keep the aqueous animal blood-lipid mixture in a liquid mobile state suitable for spray drying. Thereafter, the material can be spray dried.

It is not completely understood how the stable particulate encapsulated lipid feed supplement is formed in accordance with the process of the subject invention. It is believed, however, that what may be the key to the process comprises combining the gelled albumin of the blood protein material with the finely divided lipid globules and thereafter dehydrating the same and in essence the gellation or denaturation (believed to be caused by the high temperature step and/or base) causes a modification of the albumin of the blood proteins which in turn exposes their hydrophobic side chains. Once exposed, the hydrophobic side chains have a strong affinity for the fine oil particles in the suspension emulsion and are attracted thereto to cause the albumin to coat the oil particles or globules. The encased or encapsulated oil particles or globules are held in suspension in the gel which is recovered from the stone mill or homogenizer. However, once the water is removed by drying, a granular material results which consists essentially of the fine oil globules surrounded by albumin and other protein. Another possible key to the process may reside in the relative absence of odor of the product during and after processing as related to the typical odors associated with the manufacture of blood meal. It may be that the base treatment breaks the sulfide bonds of the sulfur bearing amino acids with the sulfur or sulfides then reacting with some other constituent thus preventing a release of free sulfur or sulfide in a gaseous form. It is not understood at this juncture whether subsequent heating is required to assist or bring about this possible reaction or the stablilizing of the possible reaction.

We have also surprisingly evidenced a rumen bypass when feed supplement of the subject invention is fed to a ruminant animal. More specifically, several researchers have shown in recent years that the microencapsulation of substances within an aldehyde-treated protein coating can be effective in protecting these substances such as lipids that would normally be degraded in the rumen by rumen micro-organisms. However, it has been found that on passing through the rumen, the protein-aldehyde coating disintegrates in the abomasum of the animal's digestive tract, and also in the lower gut thereof and releases the desired active ingredient in its original and/or hydrogenated form. Examples of such lipid protected aldehyde-protein are set forth in said U.S Pat. No. 3,925,560 cited above. The rumen bypass is best exemplified by microencapsulating a polyunsaturated vegetable oil having a high level of C 18:2 (linoleic fatty acid). This fatty acid will normally degrade and predominantly hydrogenate forming lower chain saturated fatty acids when exposed to the normal rumen digestive processes. However, when fed to the animals in the microencapsulated "protected" form such as described above, a large proportion of the C 18:2 linoleic fatty acid is bypassed through the rumen and then released in the abomasum or lower gut still in its original form. The unsaturated fatty acid can then proceed to fat deposition in the animal or in the case of a lactating cow, the composition of the milk fat can be changed increasing the level of unsaturated fatty acids. It is not understood how the dried albumin of proteinaceous coating affects protection of the microencapsulated lipid in the rumen when the feed supplement of the subject invention is fed to a ruminant animal.

It is to be clearly understood that the process of the invention has been described using an aqueous medium comprising animal blood in which the albumin content is generally from about 6 to about 10.5 weight precent. However, desirable results have been obtained using albumin derived from other sources, such as milk whey. Thus albumin derived from any source, or mixture thereof can be readily employed to produce the composition of the present invention.

The following examples are given to better facilitate the understanding of the subject invention and are not intended to limit the scope thereof.

EXAMPLE I

Initially, 400 pounds of an aqueous blood containing medium obtained from a slaughter house which contained about 16% by weight blood solids, (e.g., about 8% by weight albumin) was pretreated with approximately 1% by weight of sodium hydroxide to yield a pH of about 10.7. Next, 38.5 pounds of liquid corn oil, and the 400 pounds of the aqueous medium were preheated separately at 40° C. and then blended together in a vertical mixer to form a uniform dispersion of the corn oil in the blood containing medium. The resulting aqueous blood-corn oil mixture was then passed through a stone mill (Model 830 obtained from Moorehouse Industries, Fullerton, Calif.) and the mill gap was adjusted to raise the temperature by inducing frictional heat. The temperature of the material passing through the mill was measured at about 60° C., when the material started to gel. The gap was then reduced further and a corresponding increase in temperature was recorded. This adjustment was continued until the material was seen to be boiling as it exited the mill indicating that a temperature of at least about 100° C. had been reached. The mill gap was then widened, reducing the temperature of the milled material to a range between 70° C. and 75° C. The aqueous blood-corn oil mixture gelled satisfactorily shortly after exiting the mill throughout the temperature range of from 60°–100° C. The gel was a firm granular gel. The gel material was then passed to an argicultural dehydrator (Heil Model S.D. 75-22A) which operated at a temperature of between 190°–200° F., and was thereby dried to a moisture content of between 10 and 13% by weight. The resulting product was a dark brown, almost odorless granular to powder particulate material. The product was subjected to analysis as set forth in Table 1 below:

Table 1

| Component | % by Weight |
| --- | --- |
| Fat (dry matter) | 38.0 |
| Crude protein (dry matter) | 52.2 |
| Moisture | 10.0–13.0 |

Next, a portion of the dry material was subjected to an in vitro test to determine the extent to which it would be protected in the rumen of a ruminant animal. In the first in vitro test, samples of the product were incubated anaerobically at 38° C. with strained rumen fluid obtained from a sheep which had been fasted for at least 12 hours. The degree of hydrogenation of the polyunsaturated fatty acids was determined by comparing the percentage of these acids present in the mixtures before and after the incubation period. Separate incubations were carried out to provide samples for analysis at several time periods up to 20 hours from the start of incubation. Control incubations utilizing nonprotected lipid were carried out to assess the hydrogenation capacity of the ruminant fluid. As the results of these tests, the blood albumin lipid supplement of the subject invention showed a 105.3% resistance to rumen hydrogenation. Another in vitro test was carried out on another portion of the dry feed material whereby it was subject to incubation in a lipase enzyme medium. The lipase enzyme medium contained 40 milligrams of lipase and 1 milliliter of tris-buffer containing 250 microliters of a 0.1% bile salt and 50 microliters of a 40 weight percent calcium chloride solution. Samples of these products were incubated anaerobically at 37° C. in the lipase enzyme medium for 1.5 to 3 hour periods, while the medium was subjected to a shaker bath at about 200 oscillations per minute and compared against standards to determine the extent to which hydrogenation of the lipid occurred in the enzyme medium. Analysis showed that the in vitro testing in the lipase enzyme medium resulted in the 89.6% resistance to rumen hydrogenation.

Next, a ration was prepared containing 10% of the above described blood albumin lipid supplement. The ration formula is set forth in Table 2 below:

Table 2

| Component | Weight lbs. |
| --- | --- |
| Blood Albumin-Corn-oil supplement | 5 |
| Rolled barley | 11 |
| Chopped alfalfa hay | 34 |
| Total | 50 |

The ration was fed to a lactating dairy cow daily, being fed in 2 feeds, one morning, one evening, each feeding being half of the above total quantity set forth in Table 2. The cow was milked twice a day and the milk fat analyzed for fatty acid composition. An increase in the level of C 18:2 linoleic acid was noted in the milk fat after one day. This increased to 11.6% recorded on the 4th day of the feeding at a 10% level. The results of the 4th day analysis are given below in Table 3 and are compared with a base line analysis recorded immediately before the in vitro test commenced.

Table 3

| Fatty Acid | Baseline | 4th Day |
| --- | --- | --- |
| C 14:0 | 14.5% | 11.1% |
| C 16:1 | 34.6% | 28.0% |
| C 18:0 | 7.7% | 11.8% |
| C 18:1 | 21.0% | 25.1% |
| C 18:2 | 5.3% | 11.6% |
| C 18:3 | 1.3% | 1.1% |
| Total Milk Fat | 3.6% | 4.1% |

As can be seen, the increase of C 18:2 from a base 5.3% to 11.6% represents an increase of 118.87% on the baseline quantity of C 18:2 in the milk fat.

The in vivo test was continued and the corn oil-blood albumin supplement increased to 20% by weight of the ration. The ration formula is set forth in Table 4 below:

Table 4

| Component | Weight (lbs.) |
| --- | --- |
| Blood Albumin Corn oil supplement | 8 |
| Rolled Barley | 8 |
| Chopped alfalfa hay | 24 |
| Total | 40 |

The ration was reduced to a total of 40 lbs. to insure that the animal ate all the ration. This ration was fed for 3 days being fed twice daily —morning and evening of half of the above quantity. After 3 days, the level of C 18:2 linoleic acid in the milk fat had increased to 17.6%. The result of the third day analysis is given in Table 5 below and compared with the baseline analysis.

Table 5

| Fatty Acid | Baseline | 4th Day |
| --- | --- | --- |
| C 14:0 | 14.5% | 8.2% |
| C 16:0 | 34.6% | 24.4% |
| C 18:0 | 7.7% | 15.1% |
| C 18:1 | 21.0% | 27.1% |
| C 18:2 | 5.3% | 17.6% |
| C 18:3 | 1.3% | .8% |
| Total Fat | 3.6% | 4.9% |

As can be seen the increase in C 18:2 from a base of 5.3% to 17.6% represents an increase of 232% on the baseline quantity of C 18:2 found in the milk. A noticeable increase in total milk fat was also recorded. At the 10% supplement level, this was 13.89% increase and at 20% level 36.11%.

EXAMPLE II

Initially 800 pounds of aqueous blood containing mixture obtained from a slaughter house which contained 16% by weight blood solids (e.g., about 8% by weight albumin) was adjusted to a pH of 10.7 by adding about 1.0% by weight sodium hydroxide thereto. Next, the aqueous mixture was preheated to 40° C. by passing it through the stone mill which was described in Example I and adjusting the mill gap to create the frictional heat. The aqueous blood mixture was then placed in a vertical mixer. Next, 100 pounds of tallow, which was melted and held at 45° C. was added to the pH adjusted aqueous blood containing mixture with agitation. The mixture was blended for five minutes to thoroughly blend the ingredients and form a uniform dispersion of the melted tallow within the aqueous mixture. The mixture was then passed through the stone mill to develop frictional heat. At between about 60° to 65° C., the aqueous blood-tallow mixture began to gel. The mill gap setting was adjusted to yield a temperature of about 70° C. The firm granular gel obtained was passed into the drier operating as described in Example I to yield a dried, almost odorless, free flowing granular to powder particulate having a dark brown color.

EXAMPLE III

Initially, 800 pounds of an aqueous blood containing mixture obtained from a slaughter house and containing 16% by weight blood solids (e.g., about 8% by weight albumin) was adjusted to a pH of 10.7 by adding 1.0% by weight sodium hydroxide thereto. The pH adjusted mixture was then preheated to 40° C. by passing it through the stone mill described in Example I and adjusting the mill gap to create frictional heat. The preheated aqueous mixture was then placed in a vertical mixer. Next, 100 pounds of raw fat obtained from the dead carcasses of ruminants was comminuted to particles which passed through a ⅜ inch screen. The comminuted fat was then placed in a container and heated until it was melted and then held at about 45° C. The melted fat was then added to the aqueous mixture in a vertical mixer and agitated. The mixture was blended for about 5 minutes to thoroughly blend the ingredients to yield a uniform blend of melted fat globules within the aqueous blood containing mixture. The resulting mixture was then passed through the stone mill and the mill gap was adjusted to create frictional heat. At about 60° to 65° C. the mixture began to gel and the mill gap setting was adjusted to give an operating temperature of about 70° C. The gel was then dried in the manner described in Example I to yield an almost odorless, free flowing granular to powder particulate feed supplement which was dark brown in color.

EXAMPLE IV

An experiment was conducted to determine the effectiveness of delactosed dry whey powder as the source of albumin to produce the albumin-lipid supplement of the subject invention. Initially 1 gram of sodium hydroxide pellets was dissolved in 34 grams of water to form an aqueous solution having a pH of about 11.0. Thereafter, 25 grams of soybean oil and the aqueous solution were blended together to form a uniform dispersion of the soybean oil in the aqueous medium. Forty grams of delactosed whey powder was then blended into the aqueous soybean oil mixture. The resulting mixture has an initial pH of 11.0. The aqueous mixture containing whey and soybean oil was then passed through a laboratory stone mill and the mill was adjusted to a fine gap. The mixture was passed through the mill until a smooth resultant mixture was formed. The pH of the smooth resultant mixture was determined to be 10.7. The mixture was then heated in a water bath at 70° C. and started to gel. Heating was continued until a firm granular gel resulted at a temperature of 85° C. The gel was placed in a laboratory oven which was operated at a temperature of about 45° C. The gel was thereby dried to granular to powder particulate powder having a moisture content of between 10 and 13% by weight.

A portion of the dry material was subjected to an in vitro test to determine the extent to which it would be protected in the rumen of a ruminant animal. In the test a portion of the dry material was subjected to incubation in a lipase enzyme medium. The lipase enzyme medium contained 40 milligrams of lipase and 1 milliliter of tris-buffer containing 250 microliters of a 0–1% bile salt and 50 microliters of a 40 weight percent calcium chloride solution. The product was incubated anaerobically at 37° C. in the lipase enzyme medium for about 2 hours, while the medium was subjected to a shaker bath at about 200 oscillations per minute and compared against standards to determine the extend to which hydrogenation of the lip occurred in the enzyme medium. Analysis showed that the in vitro testing in the lipase enzyme medium resulted in from 50–55% resistance to rumen hydrogenation.

EXAMPLE V

An experiment was conducted to determine the influence of the pH of the aqueous solution on the formation of the albumin-lipid supplement of the subject invention. Initially 0.5 gram of sodium hydroxide pellets was dissolved in 34.5 grams of water to form an aqueous solution having a pH of about 9.4. Thereafter, 25 grams of soybean oil and the aqueous solution were blended together to form a uniform dispersion of the soybean oil in the aqueous medium. Forty grams of delactosed whey powder was then blended into the aqueous soybean oil mixture. The resulting mixture had an initial pH of 9.4. The aqueous mixture containing whey and soybean oil was then passed through a laboratory stone mill and the mill was adjusted to a fine gap. The mixture was passed through the mill until a smooth resultant mixture was formed. The pH of the smooth resultant mixture was determined to be 8.0. The mixture was then heated in a water bath to a temperature of 85° C. No gel was formed upon a heating of the smooth resultant mixture.

EXAMPLE VI

An experiment was conducted similar to Example V except that the amount of sodium hydroxide was increased so as to provide an aqueous mixture having a high pH value. In this experiment 0.75 gram of sodium hydroxide pellets was dissolved in 34.25 grams of water to form an aqueous solution having a pH of about 10.1. Thereafter, 25 grams of soybean oil and the aqueous solution were blended together to form a uniform dispersion of the soybean oil in the aqueous medium. Forty grams of delactosed whey powder was then blended into the aqueous soybean oil mixture. The resulting mixture had an initial pH of 10.1. The aqueous mixture containing whey and soybean oil was then passed through a laboratory stone mill and the mill was adjusted to a fine gap. The mixture was passed through the mill until a smooth resultant mixture was formed. The pH of the smooth resultant mixture was determined to be 9.6. The mixture was then heated in a water bath. At 70° C. the mixture started to gel. Heating was continued until a firm gel resulted at a temperature of 85° C.

While this invention has been described in relation to its preferred embodiments, it is to be understood that various modifications thereof will now be apparent to one skilled in the art upon reading this specification, and it is intended to cover such modifications as fall within the scope of the appended claims.

We claim:

1. A process of feeding ruminant animals a feed supplement comprising:
  (1) feeding the ruminant animals a composite feed supplement comprising a nutrient composition in an amount effective to increase milk fat, meat and milk production without causing digestive disturbance made by the process consisting of:
    (a) adjusting the pH to from about 9.6 to about 12.5 of an aqueous medium containing blood or milk whey in a sufficient amount to provide at least about 6 weight percent albumin;
    (b) dispersing globules of a nutrient lipid within said aqueous medium in an amount in the range of from about 5 to about 20% of the resulting dispersion;
    (c) heating the resulting dispersion at a temperature effective to form a gel;
    (d) recovering said gel of said nutrient lipid microencapsulated by said albumin; and
  (2) allowing the supplement to be ingested by the ruminant animals and passed through the rumen and become digested in the abomasum and lower gut and thereby assimilated by the ruminant animals.

2. The process of claim 1 wherein said albumin is obtained from blood.

3. The method of claim 1 wherein said albumin is obtained from milk whey.

4. The process of claim 1 further comprising drying said gel to form a particulate nutrient composition of dispersed lipid globules encapsulated in albumin prior to said feeding.

5. The process of claim 4 wherein said gel is dried to a moisture content of less than about 13% by weight of the total weight of the gel.

6. The process of claim 4 wherein said nutrient composition contains up to about 75 weight percent lipid therewithin.

7. The process of claim 1 wherein said nutrient lipid is animal fat.

8. The process of claim 7 wherein the dispersion of nutrient lipid within said aqueous medium is formed by initially melting said animal fat and thereafter heating said aqueous medium to about the temperature of said melted animal fat and thereafter blending together said animal fat and said aqueous medium to form said dispersion.

9. The process of claim 8 wherein said animal fat is unrendered fat.

10. The process of claim 1 wherein said dispersion is heated to a temperature in the range of between about 40° C. and about 100° C.

11. The process of claim 1 wherein said nutrient lipid comprises vegetable oil.

12. The process of claim 1 wherein the composite feed supplement is fed to a lactating ruminant animal in a nutritionally effective quantity of 25% or less of the lactating ruminant's diet to increase the weight percent of the milk fat.

* * * * *